United States Patent
Gard et al.

(10) Patent No.: US 10,428,593 B2
(45) Date of Patent: Oct. 1, 2019

(54) THREADED END OF A TUBULAR COMPONENT FOR DRILLING OR WORKING HYDROCARBON WELLS, AND RESULTING CONNECTION

(75) Inventors: Eric Gard, Genay (FR); Eliette Pinel, Le Clos des Frenes (FR); Mikael Petit, Villefranche sur Saone (FR)

(73) Assignees: VALLOUREC OIL AND GAS FRANCE, Aulnoye-Aymeries (FR); NIPPON STEEL CORPORATION, Tokyo (JP)

( * ) Notice: Subject to any disclaimer, the term of this patent is extended or adjusted under 35 U.S.C. 154(b) by 1051 days.

(21) Appl. No.: 13/700,744

(22) PCT Filed: May 24, 2011

(86) PCT No.: PCT/EP2011/002569
§ 371 (c)(1),
(2), (4) Date: Nov. 29, 2012

(87) PCT Pub. No.: WO2011/151028
PCT Pub. Date: Dec. 8, 2011

(65) Prior Publication Data
US 2013/0075083 A1    Mar. 28, 2013

(30) Foreign Application Priority Data
Jun. 1, 2010 (FR) .................... 10 02298

(51) Int. Cl.
*E21B 17/042* (2006.01)
*C09D 5/08* (2006.01)
(Continued)

(52) U.S. Cl.
CPC ............ *E21B 17/042* (2013.01); *C09D 5/084* (2013.01); *C09D 7/61* (2018.01); *F16L 15/001* (2013.01);
(Continued)

(58) Field of Classification Search
CPC ........ C09D 5/084; F16L 15/001; F16L 15/04; F16L 58/182; E21B 17/042
See application file for complete search history.

(56) References Cited

U.S. PATENT DOCUMENTS 3,899,624 A    8/1975  Sutherland
5,041,241 A *  8/1991  Fletcher .................. C23F 11/18
                                                    106/14.21
(Continued)

FOREIGN PATENT DOCUMENTS

CN    101519782 A     9/2009
FR    2 938 063 A1    5/2010
(Continued)

OTHER PUBLICATIONS

Bohm et al. "Novel Environment Friendly Corrosion Inhibitor Pigments Based on Naturally Occurring Clay Minerals"; Materials and Corrosion 52, 896-903 (2001).*

(Continued)

*Primary Examiner* — James C Yager
(74) *Attorney, Agent, or Firm* — Oblon, McClelland, Maier & Neustadt, L.L.P.

(57) ABSTRACT

A threaded end (1; 2) of a tubular component for drilling or working hydrocarbon wells, said end comprising a threaded zone (3; 4) produced on its external or internal peripheral surface depending on whether the threaded end is male or female in type, at least a portion of the end (1; 2) being coated with a dry film comprising an organic matrix in which ion exchange pigments are dispersed in proportions in the range 3% to 30% by weight; and a connection resulting from connecting two corresponding ends by makeup.

19 Claims, 3 Drawing Sheets

(51) Int. Cl.
*F16L 15/00* (2006.01)
*F16L 15/04* (2006.01)
*F16L 58/18* (2006.01)
*C09D 7/61* (2018.01)

(52) U.S. Cl.
CPC ............ *F16L 15/04* (2013.01); *F16L 58/182* (2013.01); *Y10T 428/139* (2015.01)

(56) References Cited

U.S. PATENT DOCUMENTS

| | | | |
|---|---|---|---|
| 6,485,549 B1* | 11/2002 | Novak et al. | 106/14.44 |
| 6,756,123 B2* | 6/2004 | Ha et al. | 428/416 |
| 7,481,877 B2 | 1/2009 | Gichuhi et al. | |
| 8,586,644 B2 | 11/2013 | Nagareo et al. | |
| 2001/0022149 A1* | 9/2001 | Hirose | 106/14.11 |
| 2004/0235036 A1 | 11/2004 | Beutler et al. | |
| 2007/0213429 A1* | 9/2007 | Cheng | C08G 59/24 |
| | | | 523/458 |
| 2008/0090069 A1* | 4/2008 | Walters et al. | 428/330 |
| 2008/0152545 A1 | 6/2008 | Anderson et al. | |
| 2009/0029155 A1 | 1/2009 | Gothlich et al. | |
| 2009/0110833 A1* | 4/2009 | Wright et al. | 427/299 |
| 2009/0123742 A1 | 5/2009 | Vandermeulen et al. | |
| 2009/0220780 A1 | 9/2009 | Bordet et al. | |
| 2010/0167968 A1 | 7/2010 | Pinel et al. | |
| 2012/0169048 A1 | 7/2012 | Pinel et al. | |
| 2012/0312527 A1 | 12/2012 | Pinel et al. | |

FOREIGN PATENT DOCUMENTS

| | | |
|---|---|---|
| JP | 11-158436 A | 6/1999 |
| JP | 2008-537062 A | 9/2008 |
| JP | 2011-012251 | 1/2011 |
| WO | 2004/033567 A1 | 4/2004 |
| WO | WO 2006/104251 A1 | 10/2006 |
| WO | 2007 042231 | 4/2007 |
| WO | 2008/090411 A2 | 7/2008 |
| WO | 2008 139058 | 11/2008 |
| WO | 2010 018763 | 2/2010 |
| WO | 2010/043316 A1 | 4/2010 |

OTHER PUBLICATIONS

Buchheit et al. "Active Corrosion Protection and Corrosion Sensing in Chromate-Free Organic Coatings"; Progress in Organic Coatings 47, 174-182 (2003).*

International Search Report dated Dec. 20, 2011 in PCT/EP11/002569 Filed May 24, 2011.

U.S. Appl. No. 14/348,711, filed Mar. 31, 2014, Gard, et al.
U.S. Appl. No. 13/824,812, filed Mar. 18, 2013, Gard, et al.
U.S. Appl. No. 13/977,238, filed Sep. 4, 2013, Pinel, et al.
U.S. Appl. No. 14/369,345, filed Jun. 27, 2014, Gard, et al.
U.S. Appl. No. 13/844,717, filed May 10, 2013, Gard, et al.

R.G. Buchheit, et al., "Ion Exchange Compounds for Corrosion Inhibiting Pigments in Organic Coatings", American Chemical Society, Chapter 8, pp. 108-134 (2007).

C. Deya, et al., "A new pigment for smart anticorrosive coatings", J. Coat. Technol. Res., vol. 4, No. 2, pp. 167-175 (2007).

S. Chrisanti, et al., "The Use of Ion Exchange Compounds as Corrosion Inhibiting and Sensing Pigments in Organic Coatings", Proceedings of the $3^{rd}$ International Surface Engineering Congress, Orlando, Florida (Aug. 2-4, 2004).

R. Romagnoli, et al., "The mechanism of the anticorrosive action of calcium-exchanged silica", Surface Coatings International, Part B: Coatings Transactions, vol. 86, No. 62, pp. 135-141 (2003).

S. Baik, et al., "Frictional Performances of Activated Carbon and Carbon Blacks as Lubricant Additives", Tribology Transactions, vol. 52, pp. 133-137 (2009).

"The Efficiency of Corrosion Inhibitors", $10^{th}$ International Coatings Congress, T. Gichuhi, Ph.D., Halox (2007).

* cited by examiner

THREADED END OF A TUBULAR COMPONENT FOR DRILLING OR WORKING HYDROCARBON WELLS, AND RESULTING CONNECTION

The present invention relates to a galling-resistant tubular component used for drilling and working hydrocarbon wells, and more precisely to the threaded end of such a component, said end being male or female in type and capable of being connected to a corresponding end of another component to form a connection. The invention also relates to a threaded connection resulting from joining two tubular components by makeup. The invention also relates to a process for coating such a galling-resistant tubular component.

A component which is "used for drilling and working hydrocarbon wells" means any element that is substantially tubular in form intended to be connected to another element of the same type or otherwise to finally constitute either a string for drilling a hydrocarbon well or a riser intended for maintenance, such as work-over risers, or for working, such as production risers, or for a casing string or tubing string used in working wells. The invention is also applicable to components used in a drill string, such as drill pipes, heavy weight drill pipes, drill collars and the portions of pipe connections and heavy weight pipes known as tool joints.

Each tubular component comprises one end provided with a male threaded zone and/or one end provided with a female threaded zone each intended to be connected by makeup with the corresponding end of another component, the assembly defining a threaded tubular connection.

Threaded tubular components are connected under defined loads in order to satisfy the requirements for an interference fit and seal imposed by the service conditions. The threaded tubular connection resulting therefrom is subjected to an optimum interference fit at the end of makeup, which is the gage for an optimum mechanical strength of the threaded connection, for example as regards tensile forces, but also as regards accidental break out in service, and for optimum sealing performances. The designer of the threaded connection is thus obliged to define, for a given type of connection, a value for the optimum makeup torque which must, for all assemblies of that type of connection, be lower than the plastification torque CP (to avoid plastification of the abutments and the resulting disadvantages) and be higher than the shouldering torque, CAB. Completing makeup to a torque below CAB cannot guarantee a correct relative positioning of the male and female elements and thus cannot guarantee a suitable interference fit for their sealing surfaces. Thus, the optimum makeup torque should be substantially higher than the shouldering torque, CAB. As a consequence, the greater the difference between the plastification torque CP and the shouldering torque CAB, the larger the margin for defining the optimum makeup torque, and the stronger the threaded connection will be as regards loads in service. In order to satisfy this type of specification, it is necessary to employ coatings that can obtain a difference between the plastification torque and the shouldering torque which is greater than or equal to that obtained with conventional normalized lubricants in accordance with the American Petroleum Institute's API RP 5A3.

Further, the coatings must provide the connection with good galling resistance and allow a certain number of makeup and breakout cycles to be completed without alteration to the surfaces which are brought into interfering contact. This means that the high pressure shear strength must be equivalent to or better than that of a grease conforming to API (American Petroleum Institute) standard RP 5A3 for a contact pressure of more than 500 MPa and preferably more than 800 MPa.

The threaded tubular components are connected then used under severe conditions in terms of corrosion. Again, the use of coatings that can as far as possible resist the appearance of corrosion is desirable. This corrosion degrades the geometry of the threadings and of the sealing zones. The corrosion has many origins, frequently linked to transport and/or to storage of the tubular components in zones which are hot, humid, maritime, etc.

More precisely, the invention is intended to address all or some of the technical specifications mentioned above.

The invention concerns a threaded end of a tubular component for drilling or working hydrocarbon wells, comprising a threaded zone produced on its external or internal peripheral surface depending on whether the threaded end is male or female in type. At least a portion of the end is coated with a dry film comprising an organic matrix in which ion exchange pigments are dispersed in proportions in the range 3% to 30% by weight.

Optional characteristics, which are complementary or substitutional, are defined below.

The pigments may comprise cation exchange pigments selected from the class defined by calcium, zinc, cobalt, strontium, lithium, magnesium or yttrium ion exchange amorphous silicas, calcium, molybdenum or sodium ion exchange zeolites, and calcium or cerium ion exchange bentonites.

The pigments may comprise anion exchange pigments such as vanadate ion exchange hydrotalcite.

The organic matrix may have a shear strength under contact pressures of at least 500 MPa equal to or greater than that obtained for a grease in accordance with API standard RP 5A3. At the same time, the organic matrix may have a torque on shoulder resistance value which is greater than or equal to that obtained for a grease in accordance with API standard RP 5A3.

The organic matrix may be a thermoplastic matrix.

The organic matrix may be selected from the class defined by polyamides, polyethylene waxes, copolyamides based on an acid dimer, esterified colophanes, terpene resins, styrene-terpene resins, polyether etherketones, polyfluoroalkyls, and polyethersulphones.

The organic matrix may comprise a polyethylene wax.

The organic matrix may comprise a copolyamide resin.

The organic matrix may be a thermoset matrix.

The organic matrix may comprise a polyurethane.

The polyurethane matrix may be obtained by curing a fluorourethane polymer in aqueous dispersion or in a solvent base using a polyisocyanate type hardener.

The polyurethane matrix may be obtained by curing a solid polyester polyol using a polyisocyanate type hardener.

The polyurethane matrix may be obtained by UV curing then by wet polymerization of a hybrid acrylic-urethane copolymer.

The end portion may be pre-treated by a surface preparation step selected from the group constituted by sanding, conversion treatments and electrolytic deposition, before coating it with the dry film.

The organic matrix may further comprise particles of solid lubricants.

The organic matrix may further comprise corrosion inhibitors.

The threaded zone may be at least partially coated with a dry film.

The threaded end may comprise a metal/metal sealing surface, said sealing surface being coated with dry film.

The invention also pertains to a threaded tubular connection comprising a male threaded end and a female threaded end made up one into the other, at least one of the threaded ends being coated with a dry film in accordance with the invention.

The end coated with a dry film may be the female threaded end.

The features and advantages of the invention will be described in more detail in the description which follows, made with reference to the accompanying drawings.

Figure 1:
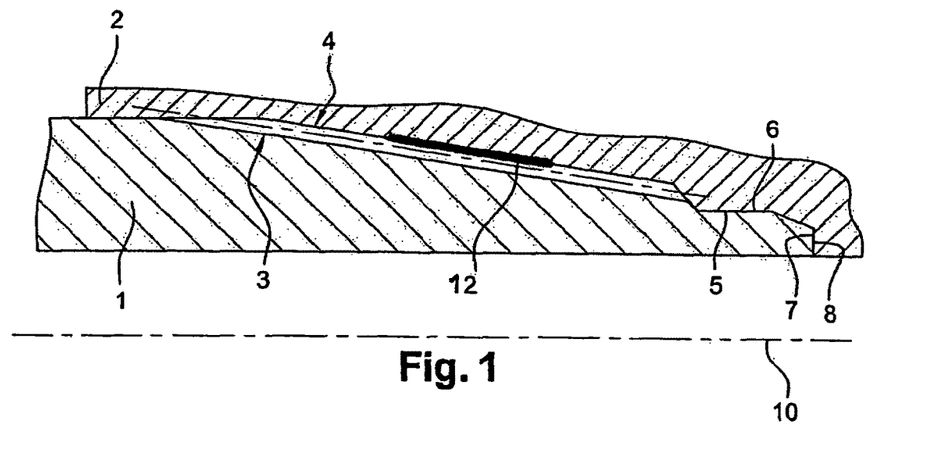
FIG. 1 is a diagrammatic view of a connection resulting from connecting two tubular components by makeup.

The threaded connection shown in FIG. 1 comprises a first tubular component with an axis of revolution 10 provided with a male end 1 and a second tubular component with an axis of revolution 10 provided with a female end 2. The two ends 1 and 2 each finish in a terminal surface which is orientated radially with respect to the axis 10 of the threaded connection and are respectively provided with threaded zones 3 and 4 which cooperate mutually for mutual connection of the two components by makeup. The threaded zones 3 and 4 may be of the trapezoidal, self-locking, etc thread type. Furthermore, metal/metal sealing surfaces 5, 6 intended to come into interference contact against each other after connecting the two threaded components by makeup are provided respectively on the male and female ends close to the threaded zones 3, 4. Finally, the male end 1 ends in a terminal surface 7 which comes into abutment against a corresponding surface 8 provided on the female end 2 when the two ends are made up one into the other. The Applicant has also developed another embodiment wherein the abutment formed in the present case by the two contact surfaces 7 and 8 is replaced by self-locking interference cooperation of the threaded zones 3, 4—see U.S. Pat. No. 4,822,081, US RE 30 467 and US RE 34467.

Figure 3:
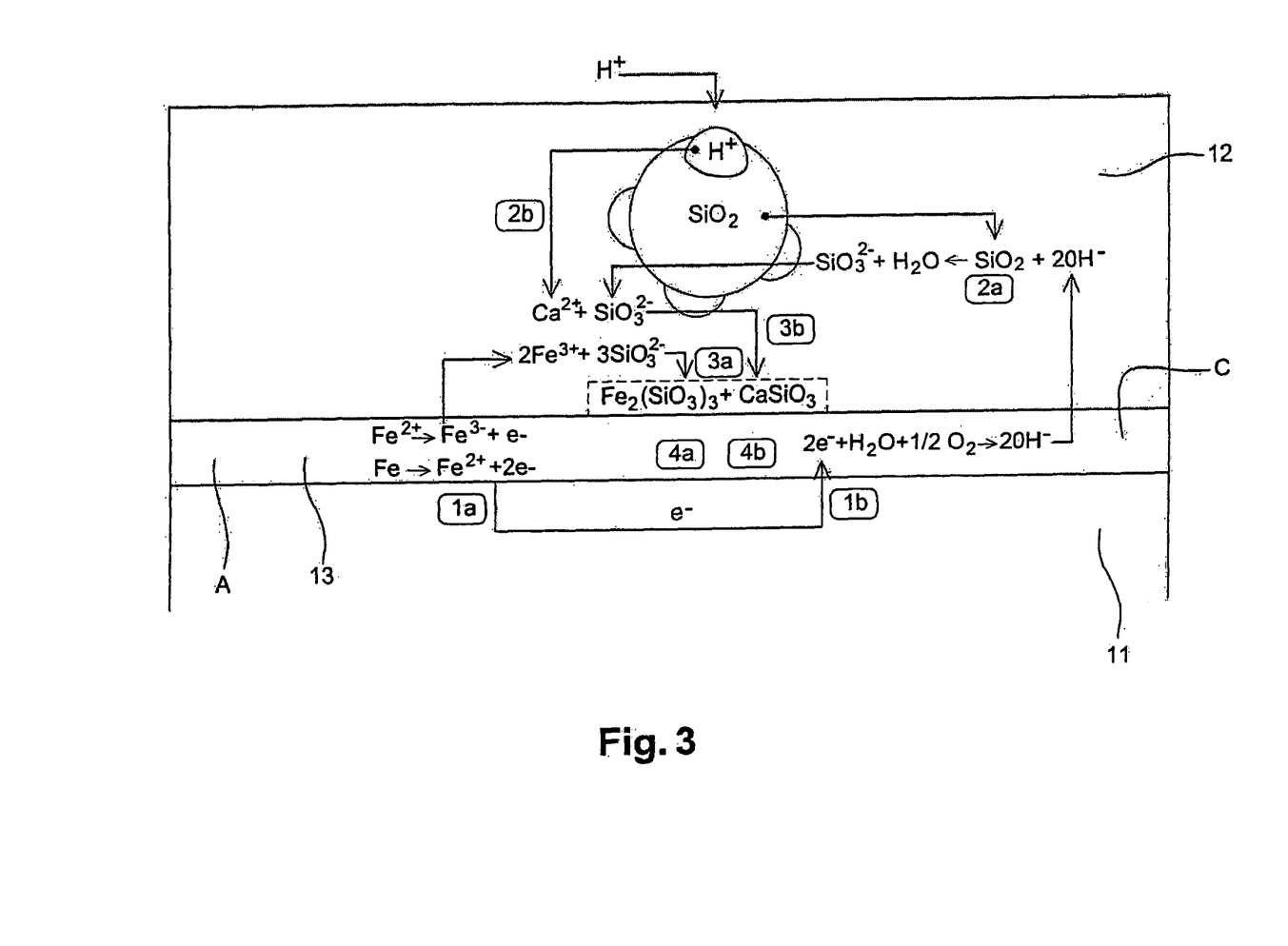
FIG. 3 is a diagrammatic view of the chemical mechanisms involved at the surface of a tubular coated component in accordance with the invention.

As can be seen in FIGS. 1 and 3, at least one of the threaded tubular connections is coated over at least a portion of one of its ends, termed the substrate 11, with a dry film 12 comprising an organic matrix containing the ion exchange pigments. The dry film 12 may at least partially cover the threaded zone 3, 4. The dry film 12 may at least partially cover the metal/metal sealing surface 5, 6. In the embodiment illustrated in FIG. 1, the dry film 12 is formed on the central zone of the threaded zone 4.

Using ion exchange pigments as corrosion inhibitors in paint type coatings is recent and is actively contributing to the gradual replacement of traditional corrosion inhibitors such as zinc chromates which are known to be extremely toxic. The protection mechanism of ion exchange pigments has been preferentially studied in organic coatings with an aqueous and/or solvent base.

The action mechanism of ion exchange pigments can be described as an electrochemical process based on two distinct steps, leading to:

adsorption of aggressive ions present in the coating 12;

the formation of an insoluble protective layer on the surface leading to passivation of the interface 13 between the substrate 11 and the coating 12.

The Applicant has paid particular attention to cation exchange silica and more particularly to calcium ion exchange silica which has produced very good results. The protection mechanism is detailed in FIG. 3 in the case of a steel substrate 11 and for a moist environment containing water, oxygen and hydroxide ions. Metallic iron atoms are generally oxidized into ferrous ions, $Fe^{2+}$, by an electrochemical mechanism 1a and in a second step may be oxidized into ferric ions, $Fe^{3+}$, at the anodic corrosion site at zone A.

Due to the permeability of organic coatings 12, oxygen and water can be present at the interface 13 between the coating 12 and the substrate 11 where oxygen is reduced into hydroxide ions, $OH^-$, by an electrochemical mechanism 1b by means of a cathodic reaction at zone C.

The silica can be dissolved into silicate ions by an electrochemical mechanism 2a as a function of the alkalinity of the coating 12. This soluble part of the ion exchange pigment may react with ferric ions by an electrochemical mechanism 3a at the interface 13 between the coating 12 and the substrate 11, forming a protective layer of ferric silicate 4a.

At the same time as this reaction, calcium ions present at the surface of the silica pigment are released following adsorption of aggressive $H^+$ ions at the silica surface by an electrochemical mechanism 2b, which on reaction by an electrochemical mechanism 3b reacts with silicate ions to form a film of calcium silicate in the alkaline zones at the surface of the metal 4b.

Calcium silicate particles may precipitate with those of ferric silicate to reinforce the insoluble protective layer by formation of a layer of mixed oxides at the metal surface.

This proposed mechanism is also valid for metal atoms other than iron, such as zinc, by the formation of a protective layer of $ZnSiO_3$ at the sacrificial anodic corrosion site. Zinc is involved when phosphatation type surface preparation or electrolytic deposition has been carried out with the aim of accentuating the corrosion resistance.

Because of their structure, cation exchange silicas also offer other benefits:

the highly basic nature of the surface of the pigment means that acid compounds in the coating are neutralized (a low alkalinity coating is not favourable to the protection mechanism);

the low density and high specific surface area compared with conventional inorganic corrosion inhibitor pigments offers better efficiency for smaller quantities;

their versatility means that a wide variety of binders, such as thermoplastic resins or thermoset resins, can be used in an aqueous, solvent or hot melt base.

Cation exchange pigments which can be used are synthetic calcium, zinc, cobalt, strontium, lithium, magnesium or yttrium ion exchange amorphous silica pigments, calcium, molybdenum or sodium ion exchange zeolites, or calcium or cerium ion exchange bentonites.

Regarding the anion exchange pigments, the anion exchange reaction more particularly occurs with an aggressive electrolyte containing chloride ions, such as vanadate anion exchange hydrotalcite.

The choice of organic matrix is preferably orientated towards organic matrixes having a shear strength at a contact pressure of at least 500 MPa which is greater than or equal to that obtained for a grease conforming to API standard RP 5A3 and having a torque on shoulder value that is greater than or equal to that obtained for a grease conforming to API standard RP 5A3. The shear strength at a contact pressure of at least 500 MPa is linked to the value for the torque on shoulder. The large high pressure shear strength is obtained from the value for the torque on shoulder, this latter being determined with respect to a reference torque for an API grease using tests on a Bridgman type machine. The tests are described in detail below in the present application.

A first class of organic matrixes has been studied, namely thermoplastics and more particularly polyamides, polyethylene waxes, copolyamides based on an acid dimer, esterified colophanes, terpene resins, styrene-terpene resins, polyether etherketones, polyfluoroalkyls and polyethersulphones.

A second class of organic matrixes has been studied, namely thermosets and more particularly polyurethanes. Several methods for obtaining polyurethanes have been envisaged:
- curing a fluorourethane polymer in aqueous dispersion or in a solvent base using a polyisocyanate type hardener;
- curing a solid polyester polyol using a polyisocyanate type hardener;
- curing a hybrid acrylic-urethane copolymer in aqueous dispersion or in a solvent base by UV polymerization then wet polymerization.

The Applicant initially carried out corrosion tests on calcium ion exchange silica and more particularly on a synthetic calcium ion exchange amorphous silica sold by the supplier GRACE DAVISON under the trade name SHIELDEX AC5.

The Applicant determined the corrosion protection supplied by the calcium ion exchange silica in various thermoplastic matrixes, said matrixes also possibly comprising supplemental additives such as solid lubricants or corrosion inhibitors.

Similarly, in some cases the test specimens initially underwent a step for surface preparation selected from the group constituted by sanding, conversion treatments such as phosphatation, or electrolytic deposition such as Cu—Sn—Zn, before they received the dry film coating.

The corrosion tests consisted of a salt spray test carried out in a climatic chamber under the following conditions: 35° C. with a 50 g/L saline solution with a density in the range 1.029 to 1.036 at 25° C., with a pH in the range 6.5 to 7.2 at 25° C. and recovered at a mean rate of 1.5 mL/h.

Specimens that were intact without rusting then had to correspond to the ReO class of ISO standard 9227 after exposure. The method provides a means of verifying that the comparative quality of a metallic material with or without a corrosion protective coating is maintained.

The water resistance tests consisted of subjecting the specimens to an accelerated corrosion test in accordance with DIN standard 50017 carried out in a climatic chamber. This test, comprising one cycle per day, consisted of depositing water vapour by condensation under the following conditions: 35° C., 90% relative humidity for 8 hours, then allowing the specimen to dry. After 7 cycles, a check is made to see whether the substrate protected by the coating has corroded.

Excellent resistance must correspond to the classifications in ISO standard 4628: no corrosion, no blistering, no cracking, nor flaking of a carbon steel plate treated by zinc phosphatation (8 to 20 $g/m^2$ deposit of phosphate) or treated by an electrolytic deposit of a ternary Cu—Sn—Zn alloy with an intermediate layer of Ni.

The results obtained were compared with those obtained with conventional organic or inorganic corrosion inhibitors, namely overalkalinized calcium sulphonate derivatives and hydrated zinc calcium strontium orthophosphosilicates.

Firstly, the Applicant determined the corrosion protection of a carbon steel surface treated with an electrolytic Cu—Sn—Zn deposit then coated with a viscoplastic type monocomponent matrix such as polyethylene wax (homopolymer) comprising various traditional inorganic corrosion inhibitor pigments (specimens A, B, D) and SHIELDEX (specimen C). Table 1 below shows that the use of calcium ion exchange silica can increase the corrosion resistance by at least 50% compared with known pigment or wax corrosion inhibitors.

TABLE 1

| Product name | Chemical nature | Specimen A (%) | Specimen B (%) | Specimen C (%) | Specimen D (%) |
|---|---|---|---|---|---|
| Licowax PE520 | Polyethylene wax | 85 | 70 | 85 | 85 |
| Nasul CA W1935 | Over-alkalinized calcium sulphonate and oxidate | 15 | — | — | — |
| Arcot 785 | Over-alkalinized calcium sulphonate and calcinate | — | 30 | — | — |
| Shieldex AC5 | Calcium ion exchange amorphous silica | — | — | 15 | — |
| Halox SZP391 | Strontium zinc calcium ortho-phospho-silicate | — | — | — | 15 |
| Salt spray test (ISO 9227) | Appearance of corrosion following exposure (hours): | 48 | 72 | 216 | 144 |

From these first results, the Applicant then sought to determine a limiting concentration that could provide satisfactory corrosion protection.

TABLE 2

| Product name | Chemical nature | Specimen A (%) | Specimen B (%) | Specimen D (%) |
|---|---|---|---|---|
| Licowax PE520 | Polyethylene wax | 95 | 90 | 85 |
| Shieldex AC5 | Calcium ion exchange amorphous silica | 5 | 10 | 15 |
| Salt spray test (ISO 9227) | Appearance of corrosion following exposure (hours): | 72 | 204 | 216 |

Table 2 shows that the corrosion protection becomes effective from a limiting concentration of 10% by weight of calcium ion exchange silica. For higher concentrations, the corrosion protection is slightly increased but a large quantity of pigments could cause heterogeneity in the film, causing unwanted porosity.

Based on an optimum concentration of 10% by weight of calcium ion exchange silica, the Applicant compared the corrosion protection of several thermoplastic matrixes with different adhesion properties for a carbon steel surface which had undergone a prior surface preparation step. In this case, it was an electrolytic Cu—Sn—Zn deposit.

The results are shown in Table 3:

TABLE 3

| Product name | Chemical nature | Specimen A (%) | Specimen B (%) | Specimen C (%) | Specimen D (%) |
|---|---|---|---|---|---|
| Licowax PE520 | Polyethylene wax | 90 | — | — | — |
| Licowax FP371 | Ethylene oxide-vinyl acetate copolymer wax | — | 90 | — | — |
| Thermelt 105 | Pure copolyamide resin (Tg = +23° C.) | — | — | 90 | — |
| Thermelt 200 | Pure copolyamide resin (Tg = −26° C.) | — | — | — | 90 |
| Shieldex AC5 | Calcium ion exchange amorphous silica | 10 | 10 | 10 | 10 |
| Salt spray test (ISO 9227) | Appearance of corrosion following exposure (hours): | 204 | 144 | 408 | 792 |

Compared with the results obtained (Table 4) with other inorganic pigments such as 10% strontium zinc calcium orthophosphosilicates and 10% zinc phosphate, the calcium ion exchange silica offers relative versatility in terms of corrosion protection whatever the thermoplastic matrixes employed, and especially with the pure copolyamide resin. In other words, the protection mechanism of the ion exchange silica means that traditional cathodic and/or anodic type mechanisms can no longer apply.

TABLE 4

| Product name | Chemical nature | Specimen A (%) | Specimen B (%) | Specimen C (%) | Specimen D (%) |
|---|---|---|---|---|---|
| Licowax PE520 | Polyethylene wax | 90 | — | 90 | — |
| Licowax FP371 | Ethylene oxide-vinyl acetate copolymer wax | — | 90 | — | 90 |
| Halox SZP391 | Strontium zinc calcium orthophosphosilicate | 10 | 10 | — | — |
| PZW2 | Dihydrated zinc phosphate | — | — | 10 | 10 |
| Salt spray test (ISO 9227) | Appearance of corrosion following exposure (hours): | 186 | 54 | 114 | 72 |

As can be seen in Table 5, the Applicant verified the importance of particle size on anticorrosion protection performance. It is desirable to use calcium ion exchange silicas with a small mean particle size for sub-layer type coatings not exceeding 20 μm. The Applicant also verified that a small particle size means that the coating thickness can be lower.

TABLE 5

| Product name | Chemical nature | Specimen A* (%) | Specimen B* (%) | Specimen C* (%) | Specimen D** (%) |
|---|---|---|---|---|---|
| Licowax PE520 | Polyethylene wax | 90 | 90 | — | — |
| Thermelt 105 | Pure copolyamide resin (Tg = +23° C.) | — | — | 90 | 90 |
| Shieldex AC5 | Calcium ion exchange amorphous silica (mean particle size 5 μm) | 10 | — | 10 | — |
| Shieldex AC3 | Calcium ion exchange amorphous silica (mean particle size 3 μm) | — | 10 | — | 10 |
| Salt spray test (ISO 9227) | Appearance of corrosion following exposure (hours): | 204 | 96 | 408 | 816 |

*Mean coating thickness = 35-40 μm;
**mean thickness = ~25 μm.

The Applicant then observed that a reduction in the thickness of the dry coating proportional to that of the particle size of the calcium ion exchange silica produces very interesting salt spray test performances with corrosion protection multiplied by two. This result opens up the prospect of a lubricating coating on a thinner thermoplastic matrix which interferes less during the shouldering phase, thus producing manageable shouldering torque values.

Regarding the tribological results concerning films, the Applicant determined the behaviour of coatings incorporating ion exchange pigments during a makeup operation specific for "premium" connections. More precisely, the torque on shoulder resistance CSB, also ToSR (Torque on Shoulder Resistance), was simulated and determined. This torque arises during makeup operations specific for premium connections used in the oil industry and represented in FIG. 2. The curve in FIG. 2 expresses the makeup torque (or interference) as a function of the number of rotational turns made.

Figure 2:
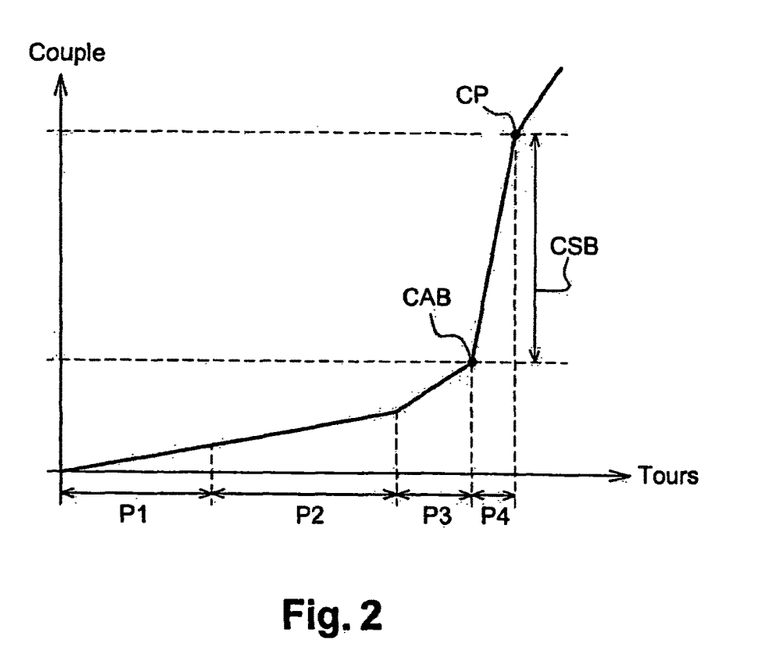
FIG. 2 is a diagrammatic view of a makeup curve for two threaded tubular components.

As can be seen, a profile for the makeup torque of "premium" connections breaks down into four portions. In a first portion P1, the external threads of the male threaded element (or pin) of a first component of a threaded tubular connection as yet have no radial interference with the internal threads of the corresponding female threaded element (or box) of a second component of the same threaded tubular connection.

In a second portion P2, the geometrical interference of the threads of the male and female threaded elements generates a radial interference which increases as makeup continues (generating a small but increasing makeup torque).

In a third portion P3, a sealing surface at the external periphery of the end portion of the male threaded element interferes radially with a corresponding sealing surface of the female threaded element to produce a metal/metal seal.

In a fourth portion P4, the front end surface of the male threaded element is in axial abutment with the annular surface of a makeup abutment of the female threaded element. This fourth portion P4 corresponds to the terminal phase of makeup. The makeup torque CAB which corresponds to the end of the third portion P3 and to the start of the fourth portion P4 is termed the shouldering torque. The makeup torque CP which corresponds to the end of the fourth portion P4 is termed the plastification torque.

Beyond this plastification torque CP, it is assumed that the male makeup abutment (end portion of the male threaded element) and/or the female makeup abutment (zone located behind the annular abutment surface of the female threaded element) is subjected to plastic deformation, which may degrade performance as regards the tightness of the contact between the sealing surfaces by plastification of the sealing surfaces too. The difference between the values for the plastification torque CP and the shouldering torque CAB is termed the torque on shoulder resistance CSB (CSB=CP−CAB).

A threaded tubular connection is subjected to an optimum interference fit at the end of makeup, which is the gauge for an optimum mechanical strength of the threaded connection, for example as regards tensile forces, but also as regards accidental break-out in service, and for optimum sealing performances. The designer of a threaded connection is thus obliged to define, for a given type of threaded connection, a value for the optimum makeup torque which, for all connections of this type of connection, must be lower than the plastification torque CP (in order to avoid plastification of the abutments and the resulting disadvantages) and be higher than the shouldering torque, CAB.

Ending makeup with a torque which is less than CAB cannot guarantee correct relative positioning of the male and female elements and thus of an effective seal between their sealing surfaces. Furthermore, there is a risk of break-out. The effective value of the shouldering torque CAB fluctuates greatly from one connection to another for the same type of connection as it depends on the diametral and axial machining tolerances of the male and female threads and sealing surface(s); the optimized makeup torque should be substantially higher than the shouldering torque CAB. As a consequence, the higher the value of the torque on shoulder resistance CSB, the larger the margin for defining the optimized makeup torque, and the more the threaded connection will be resistant to operational stresses.

Friction tests were carried out using a Bridgman type machine. This type of machine has in particular been described in the article by D Kuhlmann-Wilsdorf et al, "Plastic flow between Bridgman anvils under high pressures", J. Mater. Res., vol 6, no 12, December 1991.

Figure 4:
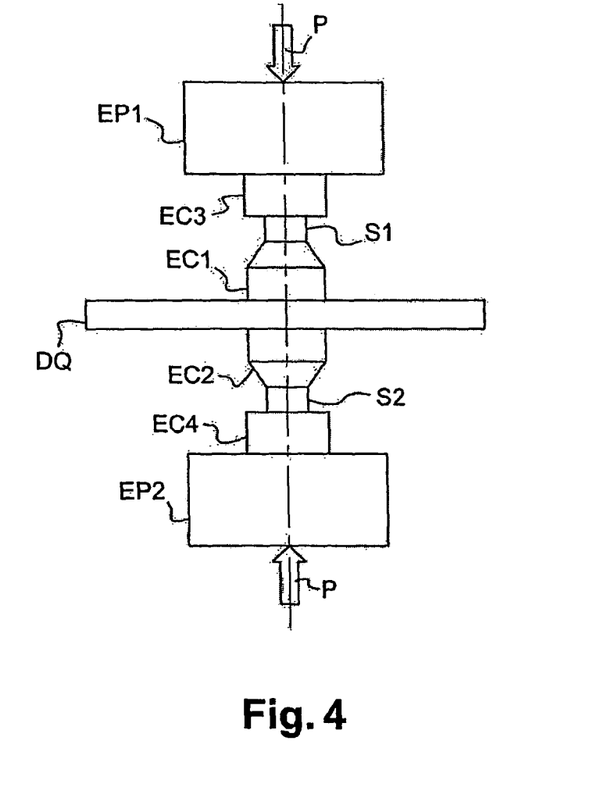
FIG. 4 is a diagrammatic view of a test set-up.

A diagrammatic and functional example of a Bridgman machine is illustrated in FIG. 4. This machine comprises:
- a disk DQ which can be driven in rotation at selected speeds;
- a first anvil EC1, preferably conical in type, permanently attached to a first face of the disk DQ;
- a second anvil EC2, preferably conical in type, permanently attached to a second face of the disk DQ, opposite its first face;
- first EP1 and second EP2 pressure elements, such as pistons, for example, which can exert the selected axial pressures P;
- a third anvil EC3, preferably cylindrical in type, which is permanently attached to one face of the first pressure element EP1;
- a fourth anvil EC4, preferably cylindrical in type, which is permanently attached to one face of the second pressure element EP2.

To test a lubricant composition, two pieces of a material identical to that constituting a threaded element are covered with said composition in order to form the first S1 and second S2 specimens. Next, the first specimen S1 is interposed between the free faces of the first EC1 and third EC3 anvils, and the second specimen S2 between the free faces of the second EC2 and fourth EC4 anvils. Next, the disk DQ is rotated at a selected speed while applying a selected axial pressure P (for example of the order of 1 GPa) with each of the first EP1 and second EP2 pressure elements, and the makeup torque to which each specimen S1, S2 is subjected is measured.

The axial pressure, the rotation speed and the angle of rotation are selected in the Bridgman test in order to simulate the Hertz pressure and the relative speed of the abutment surfaces at the end of makeup.

Using such a machine, it is possible to fix several different pairings of parameters (makeup torque, rotation speed) in order to impose predetermined makeup torques on specimens S1 and S2, and thus to check whether these specimens S1 and S2 closely follow a given makeup torque profile, and in particular whether they can reach a number of completed turns before galling which is at least equal to a threshold value selected with respect to the selected makeup torques.

In the present case, the selected contact pressure was 1 GPa and the rotation speed was 1 rpm. The test specimens were formed from carbon steel, machined then coated with different formulations of dry coatings, listed in the table below along with the determination of the torque on shoulder resistance (CSB or ToSR).

The Applicant therefore determined the tribo-rheological behaviour for various thermoplastic matrixes without an ion exchange silica pigment then with an ion exchange silica pigment using a Bridgman test. Table 6 summarizes the ToSR and the salt spray test performances for a representative portion of the thermoplastic matrixes which were studied.

TABLE 6

| | | Specimen A (%) | Specimen B (%) | Specimen C (%) | Specimen D (%) | Specimen E (%) |
|---|---|---|---|---|---|---|
| Product name | Chemical nature | | | | | |
| Dertoline PLS | Colophane esterified with pentaerythritol | 60 | 60 | | | |
| Sylvares ZT 105L | Terpene phenolic resin | | | 60 | | |
| Thermelt 105 | Pure copolyamide resin (Tg = +23° C.) | | | | 100 | |
| Thermelt 200 | Pure copolyamide resin (Tg = −26° C.) | | | | | 90 |
| Hydrogenated castor oil | Hydrogenated castor oil | 25 | | | | |
| Vestowax AV5012 | Ethylene-vinyl acetate copolymer wax | | 25 | 25 | | |
| Waxso N | Ethylene bis-stearamide wax | | | | | 10 |
| Viscoplex 6-950 | Polyalkylmethacrylate in mineral oil | 15 | | | | |

Mean thickness of coating = 30 to 40 μm

TABLE 6-continued

Mean thickness of coating = 30 to 40 μm

| Product name | Chemical nature | Specimen A (%) | Specimen B (%) | Specimen C (%) | Specimen D (%) | Specimen E (%) |
|---|---|---|---|---|---|---|
| Evathane 28800 | Ethylene-vinyl acetate copolymer | | | 12 | | |
| Lotryl 35BA320 | Ethylene-butyl acrylate copolymer | | | | 15 | |
| Benzoflex 352 | 1,4-cyclohexane-dimethanol, dibenzoate | | | 3 | | |
| Bridgman ToSR | ToSR: | 92% | 85% | 94% | 114% | 108% |
| salt spray test (ISO 9227) | Appearance of corrosion following exposure (hours): | 276 | 264 | 288 | 144 | 456 |

The results after incorporation of calcium ion exchange silica are given in Table 7:

TABLE 7

| | Specimen A1 (%) | Specimen B1 (%) | Specimen C1 (%) | Specimen D1 (%) | Specimen E1 (%) |
|---|---|---|---|---|---|
| Formulation A | 90 | — | — | — | — |
| Formulation B | — | 90 | — | — | — |
| Formulation C | — | — | 90 | — | — |
| Formulation D | — | — | — | 90 | — |
| Formulation E | — | — | — | — | 90 |
| Shieldex AC5 | 10 | 10 | 10 | 10 | 10 |
| ToSR: | 101% | 91% | 101% | 123% | 122% |
| Gain: | +10% | +7% | +7.5% | +8% | +13% |
| Appearance of corrosion (hours): | 960 | 936 | 952(*) | 756 | 816 |
| Gain: | ×2.5 | ×2.5 | ×2.3 | ×4.2 | ×0.8 |

The Applicant observed that corrosion protection was remarkably reinforced by using calcium ion exchange silica as a corrosion inhibitor pigment, which means that exposures of 750 hours or more can be achieved in a salt spray test without rusting. Passivation of the surface preparation is also very good; for all of the specimens studied, less than 10% of the surface was corroded or non-passivated after 1000 hours of exposure.

At the same time, the use of calcium ion exchange silica as a corrosion inhibitor in the various thermoplastic matrices, having exhibited only a torque on shoulder resistance in the range 80% to 110%, contributes greatly to the increase in this value for various matrices. The relative increase is in the range 7% to 13%.

In the light of these good performances, the Applicant sought to check whether the efficiency of calcium ion exchange silica was maintained in several formulations incorporating solid lubricants recognized in particular for their negative influence on the torque on shoulder resistance and the homogeneity of the coating. The compositions and performances of the formulations are given in Table 8.

TABLE 8

| Product name | Chemical nature | Specimen A* (%) | Specimen B** (%) | Specimen C* (%) | Specimen D** (%) |
|---|---|---|---|---|---|
| Thermelt 105 | Pure copolyamide resin (Tg = +23° C.) | 75 | 75 | — | — |
| Thermelt 200 | Pure copolyamide resin (Tg = −26° C.) | — | — | 67.5 | 67.5 |
| Waxso N | Ethylene bis-stearamide wax | — | — | 7.5 | 7.5 |
| Rhodorsil 47V1000 | Dimethylpolysiloxane (oil) | 5 | 5 | 5 | 5 |
| Carbofluor 3000 | Carbon fluoride | 8 | 8 | 8 | 8 |
| Timrex KS4 | Synthetic graphite | 2 | 2 | 2 | 2 |
| Shieldex AC5 | Calcium ion exchange amorphous silica | 10 | 10 | 10 | 10 |
| Bridgman ToSR | ToSR: | 140% | — | 114% | — |
| salt spray test (ISO 9227) | Appearance of corrosion following exposure (hours): | 636 | >1200 | >1200 | >1200 |

(*carbon steel specimen with electrolytic Cu—Sn—Zn deposit; **carbon steel specimen with zinc phosphatation).

Solid lubricants are generally incorporated into such matrixes to the detriment of corrosion protection because the rigidity of the coating is increased. The Applicant observed cracks and premature detachments with sample A.

In contrast, the corrosion protection performances proved to be excellent especially with sufficiently flexible thermoplastic matrices, reinforcing adhesion by mechanical coupling even with different surface preparations.

The torque on shoulder resistance values remained unchanged, demonstrating the importance of the selection of the thermoplastic matrix for the additives (solid lubricants, rheology modification additives, corrosion inhibitors) and above all the consideration of the idea of entirely unforeseeable general rheological behaviour under very high pressure.

In order to validate the calcium ion exchange silica in a definitive manner, the Applicant elected to compare different corrosion inhibitor pigments with different protection mechanisms for the same thermoplastic matrix, namely:

zinc stearate, which reduces ion permeability and increases wet adhesion;

lamellar aluminium, which increases the electrical resistance of the surface and acts as a sacrificial anode.

TABLE 9

Carbon steel specimen with electrolytic Cu—Sn—Zn deposit

| Product name | Chemical nature | Ref | Specimen A (%) | Specimen B (%) | Specimen C (%) |
|---|---|---|---|---|---|
| Dertoline PLS | Colophane esterified with pentaerythritol | 60 | 54 | 57 | 54 |
| Hydrogenated castor oil | Hydrogenated castor oil | 25 | 22.5 | 24 | 22.5 |
| Viscoplex 6-950 | Poly-alkylmethacrylate in mineral oil | 15 | 13.5 | 14 | 13.5 |
| Ligastab Zn70 | Zinc distearate | — | 10 | — | — |
| Stapa PA | Lamellar aluminium (pigment paste) | — | — | 5 | — |
| Shieldex AC5 | Calcium ion exchange amorphous silica | — | — | — | 10 |
| Bridgman ToSR | ToSR: | 92% | 86% | 87% | 101% |
| Salt spray test (ISO 9227) | Appearance of corrosion following exposure (hours): | 276 | 504 | 504 | 960 |

The Applicant came to the same conclusion when testing other thermoplastic matrixes with another corrosion inhibitor, namely calcium modified aluminium triphosphate. The very good results are shown in Table 10 below.

TABLE 10

Carbon steel specimen with electrolytic Cu—Sn—Zn deposit

| Product name | Chemical nature | Ref (%) | Specimen A (%) |
|---|---|---|---|
| Thermelt 200 | Pure copolyamide resin (Tg = −26° C.) | 67.5 | 67.5 |
| Waxso N | Ethylene bis-stearamide wax | 7.5 | 7.5 |
| Rhodorsil 47V1000 | Dimethylpolysiloxane (oil) | 5 | 5 |
| Carbofluor 3000 | Carbon fluoride | 8 | 8 |
| Timrex KS4 | Synthetic graphite | 2 | 2 |
| Shieldex AC5 | Calcium ion exchange amorphous silica | 10 | — |
| K-White Ca650 | Modified aluminium triphosphate | — | 10 |
| Bridgman ToSR | ToSR: | 101% | 100% |
| Salt spray test (ISO 9227) | Appearance of corrosion following exposure (hours): | 960 | 264 |

Finally, the performances of the ion exchange silica obtained in thermoplastic matrixes could be considerably improved, namely by reinforcing the matrix with nanometric pigments. Table 12 summarizes the results obtained.

TABLE 11

Carbon steel specimen with electrolytic Cu—Sn—Zn deposit

| Product name | Chemical nature | Ref (%) | Specimen A (%) | Specimen B (%) |
|---|---|---|---|---|
| Thermelt 200 | Pure copolyamide resin (Tg = −26° C.) | 67.5 | 37.5 | 67.5 |
| Thermelt 105 | Pure copolyamide resin (Tg = +23° C.) | — | 37.5 | — |
| Waxso N | Ethylene bis-stearamide wax | 7.5 | — | 7.5 |
| Rhodorsil 47V1000 | Dimethylpolysiloxane (oil) | 5 | 5 | — |
| Carbofluor 3000 | Carbon fluoride | 8 | 8 | — |
| Timrex KS4 | Synthetic graphite | 2 | 2 | — |
| Shieldex AC5 | Calcium ion exchange amorphous silica | 10 | 10 | 10 |
| Baikalox CR125 | Nanometric alumina | — | — | 10 |
| Bridgman ToSR | ToSR: | 101% | 126% | 119% |
| Salt spray test (ISO 9227) | Appearance of corrosion following exposure (hours): | 960 | >1000 | 1776 |

The Applicant has observed that replacing solid lubricants with a nanometric alumina with a gamma crystalline structure can considerably augment corrosion protection beyond 1500 hours exposure in a salt spray test with no rust spots, without modifying the mechanical performances as regards friction and torque on shoulder resistance. In addition, it should be noted that the synergistic combination of the ion exchange silica and the nanometric alumina also contributes to reinforcing passivation of a surface preparation of the electrolytic Cu—Sn—Zn type for salt spray test exposure times of more than 1500 hours.

The Applicant also evaluated the corrosion protection provided by calcium ion exchange silica in various thermoset matrixes, said matrixes possibly also comprising supplemental additives such as solid lubricants or corrosion inhibitors.

More particularly, the Applicant studied the corrosion protection of a carbon steel initially treated with an electrolytic Cu—Sn—Zn deposit and then coated with a fluorourethane coating. The fluorourethane coating was obtained from an aqueous dispersion of curable fluoro ethylene vinyl ether. The results obtained are shown in Table 12.

TABLE 12

| Product name | Chemical nature | Ref (%) | Specimen A (%) | Specimen B (%) | Specimen C (%) |
|---|---|---|---|---|---|
| LUMIFLON FD916 | FEVE | 87 | 81.5 | 84 | 82 |
| BAYHYDUR 3100 | Aliphatic polyisocyanate HDI (hardener) | 13 | 12 | 12.5 | 12 |
| Halox CW491 | Calcium phosphosilicate | — | 6.5 | — | — |
| Shieldex AC5 | Calcium ion exchange amorphous silica | — | — | 3.5 | — |
| Halox SZP391 | Strontium zinc calcium orthophosphosilicate | — | — | — | 6 |
| Salt spray test (ISO 9227) | Appearance of corrosion following exposure (hours): | 168 | 1008 | 504 | 1008 |

In order to improve the corrosion protection of ion exchange silica, the researchers combined calcium ion exchange silica with phosphosilicate type corrosion inhibitor pigments with the aim of obtaining synergistic effects. The results are shown in Table 13. The synergistic effects between calcium ion exchange silica and corrosion inhibitors such as Halox® 750 meant that corrosion protection of 1200 hours or more in accordance with ISO standard 9227 were obtained with no rust spots, blistering or detachment and with major passivation of the surface preparation. The weight ratio between the two corrosion inhibitors was preferably 1.

TABLE 13

| Product name | Chemical nature | Specimen A (%) | Specimen B (%) | Specimen C (%) | Specimen D (%) |
|---|---|---|---|---|---|
| LUMIFLON FD916 | FEVE | 84 | 81 | 81 | 81 |
| BAYHYDUR 3100 | Aliphatic polyisocyanate HDI (hardener) | 12.5 | 12 | 12 | 12 |
| Halox 750 | Inorganic/organic phosphosilicate | — | 3.5 | — | — |
| Halox CW491 | Calcium phosphosilicate | — | — | 4.5 | — |
| Shieldex AC5 | Calcium ion exchange amorphous silica | 3.5 | 3.5 | 2.5 | 3.5 |
| Halox SZP391 | Strontium zinc calcium orthophosphosilicate | — | — | — | 3.5 |
| Salt spray test (ISO 9227) | Appearance of corrosion following exposure (hours): | 504 | 1176 | 816 (blistering) | >1200 |

In conclusion, the calcium ion exchange silica can produce remarkable corrosion protection, especially compared with known corrosion inhibitors, whether they be overalkalinized calcium sulphonates or inorganic strontium zinc calcium orthophosphate type pigments or even of the lamellar aluminium type, and for the various thermoplastic matrixes employed.

Furthermore, the rheological behaviour of the matrix is positively influenced by the use of calcium ion exchange silica.

The use of calcium ion exchange silica can satisfy two aims, namely:
providing corrosion protection beyond an exposure period in a hostile environment of more than 750 hours using the salt spray test;
preserving or improving the value of the torque on shoulder resistance of the thermoplastic matrix.

At the same time, by incorporating a single pigment constituent into the matrix, the invention simultaneously provides corrosion resistance properties and properties that can stabilize the value of the torque on shoulder resistance at a high value without modifying the lubrication performance under low and high Hertz loads.

In the context of accentuated protection, the use of anion exchange pigments either in synergy with cation exchange pigments such as calcium ion exchange silica or replacing them should provide an even more general response to corrosion protection under humid conditions regardless of the surface or surface preparation. In fact, because their protective mechanism is particularly adapted to moist media containing chloride ions, and because of the respective electrochemical potentials of the pigments and the metal atoms on the surface, the association between the anion or cation exchange pigments could be particularly suitable, especially as a plurality of insoluble protective layers could be formed by this mechanism for different metal atoms on the surface or for different surface preparations.

As an example, the association between a calcium ion exchange silica and a vanadate ion exchange hydrotalcite should improve aggressive ion adsorption ($H^+$ and chlorides) and should in particular reinforce passivation of an electrolytic Cu—Sn—Zn deposit at the interface by an electronic interaction or physical adsorption of the ionic species present.

In terms of application, the dry films comprising an organic matrix in which the ion exchange pigments are dispersed are preferably applied to the threaded zones of tubular components used for drilling or working hydrocarbon wells. More particularly, said dry films may be deposited on the female threaded zones, said threaded zones being provided to cooperate by makeup with male threaded zones which are themselves coated with a dry film which may be of a different nature.

In a non limiting manner, the dry films comprising an organic matrix in which ion exchange pigments are dispersed may also be applied to the sealing surfaces 5, 6 described in FIG. 1 and intended to cooperate by an interference fit, and/or to the abutment surfaces 7, 8.

The invention claimed is:

1. A threaded end of a steel tubular component suitable for drilling or working hydrocarbon wells, said threaded end comprising a threaded zone on an external or internal peripheral surface of the threaded end depending on whether the threaded end is male or female,
   wherein at least a portion of the threaded end is coated with a dry film comprising an organic matrix in which 10% to 15% by weight of calcium ion exchange amorphous silica pigments are dispersed,
   wherein the organic matrix is a thermoplastic matrix comprising a thermoplastic selected from the group consisting of a polyethylene wax, a copolyamide based on an acid dimer, an esterified colophane, and a terpene resin.

2. The threaded end of claim 1, wherein the organic matrix has a shear strength under contact pressures of at least 500 MPa and a torque on shoulder resistance value which is greater than or equal to a torque on shoulder resistance value obtained for a grease conforming to API standard RP 5A3.

3. The threaded end of claim 1, wherein the organic matrix comprises a polyethylene wax.

4. The threaded end of claim 1, wherein the organic matrix comprises a copolyamide resin.

5. The threaded end of claim 1, wherein the portion of the threaded end is pre-treated by a surface preparation selected from the group consisting of a sanding, a conversion treatment and an electrolytic deposition, before coating with the dry film.

6. The threaded end of claim 1, wherein the organic matrix further comprises particles of solid lubricants.

7. The threaded end of claim 1, wherein the organic matrix further comprises corrosion inhibitors.

8. The threaded end of claim 1, wherein the threaded zone is at least partially coated with dry film.

9. The threaded end of claim 1, further comprising a metal/metal sealing surface, said sealing surface being coated with dry film.

10. A threaded tubular connection, comprising a male threaded end and a female threaded end of a tubular component connected one into the other, wherein at least one of the threaded ends is the threaded end of claim 1.

11. The threaded tubular connection of claim 10, wherein the portion of the threaded end coated with the dry film exists on the female threaded end.

12. A steel tubular component having a threaded end suitable for drilling or working hydrocarbon wells, said threaded end comprising a threaded zone on an external or internal peripheral surface of the threaded end depending on whether the threaded end is male or female, wherein at least a portion of the threaded end is coated with a dry film comprising an organic matrix in which 10% to 15% by weight of calcium ion exchange amorphous silica pigments are dispersed, and wherein the organic matrix is a thermoplastic matrix comprising a thermoplastic selected from the group consisting of a polyethylene wax, a copolyamide based on an acid dimer, an esterified colophane, and a terpene resin.

13. The steel tubular component of claim 12, wherein the calcium ion exchange amorphous silica has a particle size not exceeding 20 μm.

14. The steel tubular component of claim 12, wherein the organic matrix also contains at least one nanometric pigment.

15. The steel tubular component of claim 14, wherein the nanometric pigment is nanometric alumina.

16. The steel tubular component of claim 15, wherein the calcium ion exchange amorphous silica has a particle size not exceeding 20 μm.

17. The threaded end of claim 1, wherein the calcium ion exchange amorphous silica has a particle size not exceeding 20 μm.

18. The threaded end of claim 1, wherein the organic matrix also contains at least one nanometric pigment.

19. The threaded end of claim 18, wherein the nanometric pigment is nanometric alumina.

* * * * *